United States Patent [19]

Stall

[11] Patent Number: 5,782,683
[45] Date of Patent: Jul. 21, 1998

| [54] | COLD TEMPERATURE SHIRRING |
| --- | --- |
| [75] | Inventor: Alan David Stall, Naperville, Ill. |
| [73] | Assignee: Alfacel s.a., Madrid, Spain |
| [21] | Appl. No.: 703,796 |
| [22] | Filed: Aug. 27, 1996 |
| [51] | Int. Cl.⁶ ................................ A22C 13/02 |
| [52] | U.S. Cl. .................. 452/27; 452/21; 138/118.1; 426/513 |
| [58] | Field of Search ............... 452/27, 21, 22, 452/24, 25, 28; 138/118.1; 426/513 |

[56] References Cited

U.S. PATENT DOCUMENTS

| 604,206 | 5/1898 | Cross et al. . |
| --- | --- | --- |
| 1,036,282 | 8/1912 | Lilienfeld . |
| 1,070,776 | 8/1913 | Cohoe et al. . |
| 1,158,400 | 10/1915 | Cohoe . |
| 1,163,740 | 12/1915 | Cohoe . |
| 1,601,686 | 9/1926 | Henderson . |
| 1,612,508 | 12/1926 | Henderson et al. . |
| 1,645,050 | 10/1927 | Henderson . |
| 1,654,253 | 12/1927 | Henderson . |
| 2,001,461 | 5/1935 | Hewitt . |
| 2,010,626 | 8/1935 | Dietrich . |
| 2,181,329 | 11/1939 | Hewitt . |
| 2,583,654 | 1/1952 | Korsgaard . |
| 2,722,714 | 11/1955 | Blizzard et al. . |
| 2,794,544 | 6/1957 | Firth . |
| 2,983,949 | 5/1961 | Matecki . |
| 2,984,574 | 5/1961 | Matecki . |
| 2,999,756 | 9/1961 | Shiner et al. . |
| 2,999,757 | 9/1961 | Shiner et al. . |
| 3,028,952 | 4/1962 | Milio et al. . |
| 3,097,393 | 7/1963 | Matecki . |
| 3,110,058 | 11/1963 | Marbach . |
| 3,158,896 | 12/1964 | Marbach . |
| 3,222,192 | 12/1965 | Arnold et al. . |
| 3,250,629 | 5/1966 | Turbak . |
| 3,266,911 | 8/1966 | Clement . |
| 3,397,069 | 8/1968 | Urbutis et al. . |
| 3,451,827 | 6/1969 | Bridgeford . |
| 3,454,982 | 7/1969 | Arnold . |
| 3,456,286 | 7/1969 | Martinek . |
| 3,462,794 | 8/1969 | Martinek . |
| 3,594,856 | 7/1971 | Michl . |
| 3,616,489 | 11/1971 | Voo et al. . |
| 3,695,901 | 10/1972 | Winokur . |
| 3,798,301 | 3/1974 | Rassbach et al. . |
| 3,818,947 | 6/1974 | Rose ........................ 138/118.1 |
| 3,834,920 | 9/1974 | Rose ........................ 106/267 |
| 3,835,113 | 9/1974 | Burke et al. ............... 260/216 |
| 3,865,954 | 2/1975 | Turns et al. ................ 426/140 |
| 3,898,348 | 8/1975 | Chiu et al. ................. 426/413 |
| 3,909,882 | 10/1975 | Winokur . |
| 3,965,537 | 6/1976 | Ross et al. . |
| 3,981,046 | 9/1976 | Chiu . |
| 4,062,980 | 12/1977 | Wilson et al. .............. 426/278 |
| 4,062,981 | 12/1977 | Bridgeford ................ 426/278 |
| 4,137,947 | 2/1979 | Bridgeford ................ 138/118.1 |
| 4,248,900 | 2/1981 | Hammer et al. ............. 426/105 |
| 4,374,871 | 2/1983 | Steinbis .................... 427/236 |
| 4,489,114 | 12/1984 | Bridgeford ................ 428/36 |
| 4,528,225 | 7/1985 | Hutschenreuter et al. ...... 428/36 |
| 4,543,282 | 9/1985 | Hammer et al. ............. 428/36 |
| 4,563,376 | 1/1986 | Hammer et al. ............. 428/36 |
| 4,590,107 | 5/1986 | Bridgeford ................ 428/36 |
| 4,596,727 | 6/1986 | Higgins et al. .............. 428/36 |
| 4,688,298 | 8/1987 | Mahoney et al. ............ 452/27 |
| 4,778,639 | 10/1988 | Jon et al. .................. 264/190 |
| 4,818,551 | 4/1989 | Stall et al. ................. 426/420 |
| 4,844,129 | 7/1989 | Bridgeford et al. .......... 138/118.1 |
| 5,230,933 | 7/1993 | Apfeld et al. ............... 428/34.8 |
| 5,358,765 | 10/1994 | Markulin .................. 428/34.8 |

FOREIGN PATENT DOCUMENTS

| 0 041 149 | 5/1981 | European Pat. Off. ........ A22C 13/02 |
| --- | --- | --- |
| 30 20 764 | 12/1981 | Germany ................. A22C 13/02 |
| 3622512 | 1/1988 | Germany ................. 452/27 |
| 163227/1982 | 3/1984 | Japan ..................... A22C 13/00 |
| 549161/4 | 11/1985 | Spain ..................... A22B 13/00 |

*Primary Examiner*—Willis Little
*Attorney, Agent, or Firm*—Marshall, O'Toole, Gerstein, Murray & Borun

[57] ABSTRACT

The present invention provides an improved method of shirring cellulosic skinless sausage casing comprising applying a shirring solution to the interior of the casing interior the improvement comprising applying a shirring solution to the casing at a temperature less than 10° C.

12 Claims, No Drawings

COLD TEMPERATURE SHIRRING

BACKGROUND OF THE INVENTION

This invention relates to provision of an improved method of moisturizing shirred cellulose casing, normally referred to as skinless sausage casing.

Tubular cellulosic casing is well-known, and has been widely used for many years by numerous manufacturers. The basic process for manufacturing regenerated cellulosic casings is through the well-known viscose process, which creates a liquified colloidal dispersion of cellulose fibers in an alkaline liquid carrier. Viscose is described in English Patent 8700 to Cross, Bevan and Beadle. Patents such as U.S. Pat. No. 1,036,282 to Lilienfield refine the compositions. U.S. Pat. No. 1,070,776; U.S. Pat. No. 1,158,400; U.S. Pat. No. 1,163,740 to Cohoe and Fox describe use of viscose to manufacture a tubular cellulosic casing. Henderson U.S. Pat. No. 1,601,686; U.S. Pat. No. 1,612,508; U.S. Pat. No. 1,645,050; U.S. Pat. No. 1,654,253 provide basic technology to manufacture viscose into tubular casings with regenerating baths touching the inner and outer surfaces of the tube.

Very specific details for manufacture of modern day casings from viscose into regenerated cellulose are shown in U.S. Pat. Nos. 2,999,756 and 2,999,757 to Shiner; U.S. Pat. No. 3,835,113 to Burke, U.S. Pat. No. 4,590,107 to Bridgeford; U.S. Pat. No. 4,778,639 to Jon; and U.S. Pat. No. 5,358,765 to Markulin. These references describe extruding viscose (sodium cellulose xanthate, sodium hydroxide, water) through an annular die into a coagulating and regenerating bath to produce a regenerated cellulosic tubular casing.

The artificial sausage casing is conventionally shirred wherein long tubular lengths, often called "strands" are compacted to provide shorter, coherent tubes, often called "shirred sticks" or "sticks". The coherency of the stick is important in order that it remain straight and rigid. This is difficult to achieve, considering the shirring operation includes moisturizing and oil addition. Conventional shirring methods are illustrated by patents such as U.S. Pat. No. 2,001,461; U.S. Pat. No. 2,010,626; U.S. Pat. No. 2,583,654; U.S. Pat. No. 2,722,714; U.S. Pat. No. 2,983,949; U.S. Pat. No. 2,984,574; U.S. Pat. No. 3,097,393; U.S. Pat. No. 3,110,058; U.S. Pat. No. 3,397,069; U.S. Pat. No. 3,454,982; and U.S. Pat. No. 3,898,348. Chiu, U.S. Pat. No. 3,898,348 describes a coherency test of applying a beam bending moment to the shirred stick, with 1.0 inch-lbs bending moment being the minimum acceptable standard, and 2.5 inch-lbs being desired. Accordingly, it is well known in the art that coherency of the shirred stick is essential for utility.

Small diameter shirred food casings must be packaged for distribution and sale, and this packaging is critical to the performance of the commercial product because the casing has a thickness of 20 to 40 microns and can be easily damaged. Accordingly, the shirred sticks must be rigidly supported to prevent dimension deformation, survive the rigors of transportation, and yet be easily dispensed without much waste packaging at the final use. The shirred casing product is then filled with meat paste using high speed filling machines. The stuffing operation will handle sticks typically from 265 mm length to 546 mm length, containing casing typically ranging from 16.5 meters up to and in excess of 69 meters. Thus, one shirred stick could provide in excess of 500 frankfurters. Any defects in the stick are therefore costly to the meat processor.

As one aspect of the shirring process it is known that administration of a shirring solution to the casing interior provides various advantages during shirring. Administration of the internal shirring solution moisturizes the casing allowing it to achieve final humidity and to avoid breakage and further allows for the addition of peeling and release agents to the interior of the casing. Moreover, the casing, upon being wetted by solution, shrinks slightly, about 1% to 3%, with this shrinkage greatly reinforcing the interested cones formed during shirring and providing improved coherency to the shirred sticks.

One preferred material for shirring of cellulose food casings is white food grade mineral oil. U.S. Pat. No. 2,983,949 to Matecki outlines the use of White U.S. Mineral Oil of Saybolt viscosity 76° to 80° in the internal inflation air stream of the shirring machine. Other lubricants including cotton seed oil, soya oil, glycerine are also known for coating the inside surface of the casings. Oil is generally applied internally at a rate of from 5 to 25 mg per 100 square inches. Lubricating oil is also shown by Matecki to be applied to the external casing, both to lubricate the shirring rolls to prevent heat build up, and to lubricate the casing to prevent damage during shirring and later stuffing with meat emulsion. In U.S. Pat. No. 3,097,393, Matecki specifies the use of White Mineral Oil, Saybolt viscosity 76° to 80° for external coating of casings with coverage onto the casing of between 0.002 grams to 0.013 grams per 6 inch casing length. Oil is thus generally applied externally at a rate of from about 20 to about 100 mg per 100 square inches.

Marbach, U.S. Pat. No. 3,110,058 shows a typical system for spraying internal liquids. Marbach also shows in U.S. Pat. No. 3,158,896 a means of using a commercial force-fed lubricator to apply this mineral oil. Arnold, U.S. Pat. No. 3,222,192 shows using water as the external lubricant for the shirring rolls, as well as for a means of increasing shirred stick moisture to the desired ratio of 17% to 18% by total weight of all components. Arnold also describes adding the moisture internally to the stick inside wall during shirring as an alternate method and adding surface active agents to increase wettability. Prior to this, casings were humidified externally in the packaged state as shown by U.S. Pat. No. 2,181,329; U.S. Pat. No. 2,794,544; U.S. Pat. No. 3,028,952 and U.S. Pat. No. 3,250,629.

Clement in U.S. Pat. No. 3,266,911 shows the external oiling system describing mineral oil as the external lubricant. Bridgeford shows in U.S. Pat. No. 3,451,827 a mandrel designed to internally spray coatings onto the casing inner walls during shirring using compressed air as the propellant and exhausting the excess air. Bridgeford also discloses the use of external lubricating oil. Suitable lubricating oils include but are not limited to mineral oil, vegetable oils and glycerols with various additives including lecithin and carboxymethylcellulose.

Martinek in U.S. Pat. No. 3,456,286 teaches a means for using Bridgeford's technology to tightly compact casing. Martinek, U.S. Pat. No. 3,462,794 also discloses a fluid applicator to apply external shirr moisture to the casing, coincident with internal addition. Michl in U.S. Pat. No. 3,594,856 also added external moisturizing to the casing, post-shirring. Voo, U.S. Pat. No. 3,616,489 discloses a system to spray the shirred stick internal bore after shirring. Rose, U.S. Pat. Nos. 3,818,947 and 3,834,920 discloses using a mineral oil coating inside (N.F. No. 9) along with a surfactant Myvacet 9-45 (acetylated glycerol monooleate) to more uniformly coat the mineral oil.

Chiu, U.S. Pat. No. 3,898,348 shows that the shirring solution can serve as a peeling agent, moisturizing agent and shirrability enhancer. Chiu teaches the use of shirring solutions comprising mixtures of water soluble cellulose ethers such as carboxy-methyl cellulose (CMC), mineral oil, surfactants (preferably polysorbate surfactants available as Tween® (ICI Chemicals)), and water, with polyols such as glycerine, sorbitol, propylene glycol and triethylene glycol being used as humectants to retard the penetration of the spray into the casing. Shirr solutions were taught to preferably be applied at 25° C. temperature (i.e., ambient room temperature) and were said to be characterized by viscosities of 500 cps with a maximum of 1500 cps. It is theorized that if the shirring solution penetrates slowly, the casing does not experience shrinkage while it is on the shirring machine. As a result the tendency of the casings to seize the mandrel is reduced and the products can be manually transferred and manipulated on the shirring machine. Chiu shows that reducing the humectant (i.e. propylene glycol) in the shirr solution allows faster water penetration increasing the rate of casing shrinkage and thus affecting the ability to slide the casing on the mandrel. However, if too much humectant is used, dimensional change can occur for several days after shirring in a relatively uncontrolled state resulting in excessive and undesirable dimensional change. Chiu, U.S. Pat. No. 3,981,046 further taught the use of propylene glycol as a humectant where the moisture of the final casing was produced in excess of 17% by using a humectant during shirring to reduce the rate of water imbibition by the casing.

Developments in the art since Chiu have resulted in a reduction of the quantity of propylene glycol added during shirring. While a 60% propylene glycol concentration in the shirr spray was typical at the time of Chiu propylene glycol concentrations have more recently dropped to about 10% while other methodologies have been introduced to allow the sticks to be transferred easily without the retardation of water. It is known in the art that when levels of propylene glycol are reduced it becomes more difficult to remove the shirred stick from the mandrel, after compression, due to the shrinkage exerted by the stick onto the mandrel. The casing can be damaged and the mandrel, itself, can bend and be damaged. Forces of several hundred pounds are not uncommon for stripping the shirred stick. Accordingly, it is now common to use very smooth surfaces such as those coated with Teflon® non-stick coatings to allow easier removal typically as disclosed in U.S. Pat. No. 3,097,393. Nevertheless, smooth coatings are difficult to use and still cause flattening of pleats and result in the radial reduction of the bore of the shirred stick. It is also known to taper the mandrel diameter towards the end of travel to alleviate the pressure. This can result in a smaller than desired stick bore (inner diameter) and often causes non-uniformity of stick inner and outer diameters. Accordingly, there is a desire in the art for alternative methods to reduce propylene glycol levels.

Much effort in the art has been addressed toward alternative methods for improving the coherency of shirred casings. Winokur, U.S. Pat. Nos. 3,695,901 and 3,909,882 disclose methods for providing higher coherency by indenting the stick outer diameter with grooves. Rasbach, U.S. Pat. No. 3,798,301 discloses passing the shirred stick through a heated annular orifice to increase stick coherency.

Wilson, U.S. Pat. No. 4,062,980 discloses using sorbitan trioleate and glycerol monooleate as surfactants of the humidification fluid. Bridgeford in U.S. Pat. Nos. 4,062,981 and 4,137,947 describe use of sorbitan trioleate as a lubricating surfactant for the shirring spray, providing wettability and anti-jamming properties, yet achieving 14% to 20% shirred stick moisture. The method also reduces post-doffing stick expansion.

Hammer, U.S. Pat. No. 4,248,900 describes applying the release agents prior to shirring, winding the casing up, and then later shirring. Bridgeford in U.S. Pat. No. 4,489,114 combines arabinogalactans with cellulose ether to improve peelability by improving resistance to gluing of the pleats due to the cellulose ethers on the interior side. Hutschenreuter in U.S. Pat. No. 4,528,225 describes peeling systems of oils, cellulose ethers and chemical starches.

Hammer, U.S. Pat. No. 4,543,282 describes application of the shirring spray at ambient temperature, that is between 15° C. and 30° C., using various combinations of waxes, silicone oils and cellulose ethers. Alternate mixtures by Hammer are shown in U.S. Pat. No. 4,563,376. Higgins in U.S. Pat. No. 4,596,727 provides shirring solutions using Mazol 80 MG as a surfactant but maintaining propylene glycol at 22.5% to 49.00% in solution with final shirred stick moisture contents of 17% to 19.3%.

Stall in U.S. Pat. No. 4,818,551 recognized the dimensional change of shirred sticks and provided for this by maintaining the shirred casing on a dowel for 72 hours after shirring to allow full penetration of the shirr spray without loss of dimensional integrity of the shirred stick.

Bridgeford in U.S. Pat. No. 4,844,129 uses polydextrose additives for prevention of pleat lock. Apfeld in U.S. Pat. No. 5,230,933 uses a water soluble cellulose ether, dextrin, as a coherency enhancer and, optionally, lecithin as a peeling acid, optionally with a surfactant. Lecithin has been used by others, such as Japanese Patent 1632287/1982 to Suguro and Spanish Patent 549,161/4 to Michelena.

SUMMARY OF THE INVENTION

The present invention provides an improvement in methods of shirring cellulosic skinless sausage casing comprising applying a shirring solution to the interior of the casing interior the improvement comprising applying said shirring solution to the casing at a temperature of less than 10° C., preferably less than about 7° C. and most preferably about 5° C. in order that the casing be maintained at a cool temperature during shirring. As one aspect of the invention, it has been found that casings shirred having temperatures less than 15° C. and preferably less than 10° C. during shirring maintain improved coherency compared with casings shirred under conditions in which their temperature rises above ambient. As a further aspect of the invention, it has also been found that the concentration of polyol used in a shirring solution may be reduced to less than 5%, less than 1% or even eliminated without concomitant loss of properties when the spray is applied at reduced temperatures.

The low temperature shirring methods of the present invention may generally be used according to conventional practice in the art with the major difference relating to the reduction of polyol concentrations in the shirring spray.

Shirring solutions typically comprise major proportions of water as well as a polyol such as propylene glycol, glycerine or sorbitol, and mineral oil. Other components are also incorporated into the shirring solution to improve the functionality of the shirring solution.

One major purpose of shirr spray solutions is to promote peeling of the casing from the meat paste. Preferred components of shirr solutions for the promotion of peeling include cellulose ethers, with carboxymethyl celluloses (CMCs) being preferred and the CMC available as CMC-7LF from Hercules Incorporated (now renamed Aquilon Division) being particularly preferred. Such peeling agents help create a gelatinous coating between the meat paste and the casing preventing adherence of the meat fibers to the casing wall.

In is well known in the art that certain meat processing conditions require the addition of an extra additive into the shirring solution to aid peeling. One useful additive is a lecithin compound, with Lecithin Centrophil®W, Centrophase®NV and other Centrophil series lecithins available commercially from Central Soya being particularly preferred. These lecithins are liquid at room temperature with a low viscosity (150 cps), ideal for mixing. Other suitable lecithins include Beakin LV1 and Beakin LV3 available from ADM Ross & Rowe. While the viscosity of lecithin is highly sensitive to temperature (for example, the viscosity of Centrophil W doubling to 300 cps when reduced from room temperature to 40° F.) those of skill in the art provided with the teachings herein would be capable of selecting appropriate lecithins and other components for low temperature shirring.

Lecithin also functions as an emulsifier and surfactant in shirring solutions and is used to help wet the spray onto the casing and to help keep surface tensions sufficiently low that the carboxymethylcellulose cannot bind together as a glue on inner pleat surfaces. Additional lubricating surfactants such as sorbitan trioleate available as Span-85® (ICI Americas, Inc.) are also desirable as components of the mixture. Span-85™ has an HLB of 1.8 and is particularly preferred as a lubricating surfactant. Other surfactants are available to those of skill in the art including Arlacel 186™, Arlatone 985™, Arlatone T™, Brij 93™ and Tween 81™ which have low HLBs and are suitable for use as "oily" lubricants in shirring solutions.

Shirring solutions preferred for use with the present invention are generally similar to conventional shirring solutions with the major differences that they comprise reduced levels of polyols and are sprayed cold onto the casing. One preferred composition for use according to the methods of the invention is set out below:

|  | Percent in Solution | Coverage on Casing, mg/100 cm$^2$ |
| --- | --- | --- |
| Water | 87.5 | 35.9 |
| Cellulose ether (CMC-7LF) | 1.1 | .45 |
| Lecithin (Centrophil W ™, Central Soya) | 1 | .41 |
| Propylene Glycol or Glycerine | 5.9 | 2.42 |
| Sorbitan trioleate (Span 85 ®) | .5 | .20 |
| Mineral Oil (Britol 6NF), inside | 4 | 1.64 |

This composition is preferably applied to the interior of the casings at a rate of 41 mg of solution per 100 cm$^2$.

In addition to application of the shirring solution to the interior of the casing to be shirred, it is preferred that a lubricant such as mineral oil be applied to the exterior of the casing. According to one method of the invention mineral oil is applied to the exterior of the casing at a coverage of 9.3 mg per 100 cm$^2$. Further, it is preferred that the lubricant administered to the outside of the casing to be shirred is cooled to less than 15° C. and preferably to about 10° C. in order to further cool the shirred casing. When the mineral oil is to be cooled in this manner it is also preferred that a lighter weight mineral oil be used such as Drakeol White Mineral Oil Number 6 characterized by a viscosity of 58–64 SUS @ 100° F. Another preferred mineral oil is Britol 6 NF (Witco Corp., Greenwich Conn.) which is characterized by a viscosity of about 15 centistokes at room temperature and about 32 centistokes at 5° C.

According to one aspect of the invention, the shirring solution is applied to the interior of the casing at a temperature of about 5° C. by means of a commercial spray nozzle such as those available as Models SU34OC and SUJ34OC from Spraying Systems Co., Inverness, Ill. Such nozzles require the introduction of air to atomize the shirring solution and may utilize a three channel system configuration such as that disclosed in German DE 3020764 A1 and European Patent No. 0041149.

According to another aspect of the invention the mineral oil and surfactant such as sorbitan trioleate (Span 85™) are maintained apart from the other components of the shirr spray until being introduced into the liquid flow immediately at the shirring machine. Specifically, the water, CMC, and polyol components are premixed together as a first solution. First, the propylene glycol is added to the tank, then the water and CMC are added together using a commercial eductor such as is available from Aquilon. The mixture is stirred slowly for 30 minutes.

The sorbitan trioleate has a very low HLB of 1.8, and mixes easily with the mineral oil which is preferably a low viscosity mineral oil such as Drakeol White Mineral Oil Number 6 characterized by a viscosity of 58–64 SUS @ 100° F. These are mixed together as a second solution. Both the first and second solutions are preferably maintained apart and are pumped independently to the shirring machine. The two solutions are cooled to 5° C. prior to entering the shirring machine where they mix with the mixing continuing as they travel the mandrel length. An optional in-line static mixer can be placed in the mandrel if required to enhance mixing.

The air is introduced separately. The two solutions preferably mix in the Spraying Systems nozzle and spray the inside of the casing. Alternatively, there are other nozzle styles in which the air and solution can mix at the nozzle exit meeting in the spray itself as typified by Spraying Systems nozzle SNEISB. Excess air and fugitive liquid exit through the mandrel with backpressure being maintained according to methods known to the art.

According to another aspect of the invention the external oil is applied cool at a temperature of about 10° C. The combination of cool internal and external liquids functions to significantly cool the shirred casing and cools the shirring rolls as well. Normally, the shirring operation is very vigorous and shirred sticks can reach temperatures of 60° C., especially on high pack items such as 210 foot and 225 foot casings. The cool shirring solutions counteract this heat transfer, keeping the stick at maximum 30° C. at all times. Also, the cooler casing is stiffer, making it more coherent and more rigid. The cooling also provides the benefit of increasing the viscosity of the liquid and thereby retarding the penetration of shirring solution into the casing much the same way as use of a humectant does. Consequently, the quantity of humectant required for easy shirrability can be reduced or even eliminated while maintaining good shirrability results. The solution will eventually penetrate into the stick more readily than if a humectant were used, but the stick will not dimensionally grow because enough solution penetrated at the start of shirring to cause the casings to swell in thickness at that time. Less swelling occurs later compared to the swelling of humectant inhibition since the water has a molecular weight of 18 compared to propylene glycol at 76, and the water will not distort the crystalline lattice structure to the extent that an absorbed polyol such as propylene glycol will.

By keeping the first and second solutions apart until shirring incompatible components need not be forced into a mixture. Premixing all components is not necessary in any case since it has been found that higher molecular weight components such as lecithin, sorbitan trioleate, and mineral oil do not penetrate into the casing but rest on the surface to lubricate the CMC from sticking since CMC also does not penetrate the casing. The water and propylene glycol fully penetrate the casing over one week's time. Thus, the shirring solution separates in the casing and therefore need not be premixed prior to its application.

According to this method, the resulting shirred stick is characterized by a high initial level of coherency which if measured according to the method of Chiu, U.S. Pat. No. 3,898,348 would be characterized by a beam bending moment of 2.5 in-lbs or greater.

In contrast, if the above typical composition were applied through conventional (non-low temperature) application means, a stick having a low initial coherency would be produced. Using Chiu's coherency method, the initial coherency could well be under 1.0 in-lb when measured after shirring. It is well known in the art, however, that coherency increases over time, often doubling in value over two or three days. This is due to many factors including: shrinkage of the casing, which amplifies the grabbing effect of internested truncated cones; penetration of water and humectants into the casing causing the casing to swell and resulting in the surface being freer of liquids allowing more pleat-to-pleat adhesion and contact; and stiffening of the casing, as it cools and equilibrium is achieved along with drying of the surface due to air contact.

The temperature and rate of application of the shirring solutions may readily be adjusted as would be apparent to those of ordinary skill in the art for casing sticks of differing sizes given the foregoing teachings of the invention. A typical example is for USA caliber 24 casing which weighs 2.6 grams per meter with a maximum flatwidth of 33 mm. It, therefore, has a weight of 0.40 gm per 100 cm$^2$ when slit flat open. The heat capacity of the shirred product is about 0.5 cal/g° C. (cellulose+liquid). 100 cm$^2$ of casing thus generates about 4 calories of heat when the temperature rises from 20° C. to 40° C. The shirr spray has a heat capacity of about 0.95 cal/gm° C. and when applied at 41 mg/100 cm$^2$ and 0° C., along with external mineral oil applied at 0° C., the potential heat removal effect is to reduce the 40° C. stick to 33° C. This heat removal is sufficient to substantially increase stick coherency greatly since coherency loss increases exponentially with stick temperature increases.

If additional cooling is desired to further reduce stick temperature, this can be gained by increasing temperature drop of the solution in the mandrel nozzle such as by adiabatic throttling. By selecting the correct nozzle, an additional temperature drop of 15° C. of solution temperature can be gained during spray discharge. A high pressure drop spray nozzle is required, with about 80 psi inlet air pressure into the mandrel.

A further means to enhance the cooling is to add a supercooled air blast on the stick during compression. For purposes of this invention, supercooled air is defined as air cooled to a temperature of less than 0° C. and is preferably less than −20° C. For example, Caliber 24 casing, 110 feet of casing shirred into a stick 40 cm long, needs to have about 800 calories of heat removed to reduce temperature from 35° C. to a desired temperature of 20° C. Air has a heat capacity of 0.24 cal/g° C. and a density of about 1.3 g/liter. If air were cooled to −20° C. and blasted on the stick for 10 seconds, approximately 120 liters of air would be needed in the 5 second period or about 1600 liters per minute of air flow (56 cubic feet per minute). This is a reasonable quantity since a size 24 shirred stick has about 300 cm$^2$ surface area and this equates to a uniform velocity of about 56 meters/minute over the stick periphery.

Another method to cool the shirred casing is to supercool the inflation air. Typically, about 140 liters per minute of propellant air is needed to fully atomize the liquid in the spray system nozzle. The amount of propellant air can be increased even to 300 liters per minute, which is excess for atomizing, but not necessarily excess for heat transfer. The 110 foot product shirrs at 500 meters per minute, requiring 4 seconds of shirring head motion. In this 4 seconds, 12 grams of dry compressed air are transmitted through the shirring mandrel. If the propellant air were cooled to 0° C., it would be able to transmit enough heat to rise to about 15° C., which transmits 43 calories, further reducing temperature of the casing by about 1° C.

The invention thus provides improved methods of shirring whereby the shirred stick is always maintained at a temperature below 15° C., and preferably kept even as low as 10° C. The final stick temperature, fresh at the point of removal from the mandrel, can be controlled to maximize the benefit of improved coherency versus retarded absorption rate. Various combinations of the cooling methods can thus be used to control the stick characteristics.

The methods of the invention thus allow the use of a wide variety of combinations of surfactants and humectants such that the cool casing will have adequate coherency to survive the rigors of fresh doffing from the machine, with final coherency being gained while the stick resides in the package. The final combination of cooling means can thus be chosen according to tests performed by those skilled in the art designed to optimize each aspect.

Numerous modifications and variations in the practice of the invention are expected to occur to those skilled in the art upon consideration of the foregoing description of the presently preferred embodiments thereof. Consequently, the only limitations which should be placed upon the scope of the present invention are those which appear in the appended claims.

What is claimed:

1. In a method of shirring cellulosic skinless sausage casing comprising applying a shirring solution to the interior surface of the casing the improvement comprising, applying said shirring solution to the interior of the casing at a temperature of less than 10° C.

2. The shirring method of claim 1 wherein the shirring solution is applied at a temperature of less than 7° C.

3. The shirring method of claim 1 wherein the shirring solution comprises water, a cellulose ether, lecithin, a polyol, mineral oil and a surfactant.

4. The shirring method of claim 3 wherein said cellulose ether is carboxymethylcellulose and said polyol is propylene glycol.

5. The shirring method of claim 1 wherein the shirring solution is cooled by adiabatic throttling.

6. The shirring method of claim 1 wherein an external lubricant is applied to the exterior of the casing at a temperature of 10° C. or less.

7. The shirring method of claim 6 wherein the external lubricant is mineral oil.

8. The shirring method of claim 1 wherein the shirring solution comprises a polyol selected from the group consisting of glycerine and propylene.

9. The shirring method of claim 8 wherein the shirring solution comprises less than 5% by weight polyol.

10. The shirring method of claim 9 wherein the shirring solution comprises less than 1% by weight polyol.

11. The shirring method of claim 1 comprising the step of cooling said casing with supercooled air during the shirring process.

12. The shirring method of claim 1 wherein said casing does not exceed 10° C. during shirring.

* * * * *

UNITED STATES PATENT AND TRADEMARK OFFICE
CERTIFICATE OF CORRECTION

PATENT NO. : 5,782,683
DATED : July 21, 1998
INVENTOR(S) : Alan D. Stall

It is certified that error appears in the above-identified patent and that said Letters Patent is hereby corrected as shown below:

Title page, under
    U.S. Patent Documents: After "...Chiu", add "452/27".

Col. 2, line 7: After "reinforcing the", delete "interested" and insert - -internested- -.

Col. 8, line 55: After "...and propylene", insert - -glycol - - .

Signed and Sealed this

Twenty-seventh Day of June, 2000

Attest:

Q. TODD DICKINSON

*Attesting Officer*      *Director of Patents and Trademarks*